United States Patent [19]

Toshiyuki et al.

[11] Patent Number: 5,093,924
[45] Date of Patent: Mar. 3, 1992

[54] CHANNEL ASSIGNING METHOD IN A MOBILE COMMUNICATION SYSTEM

[75] Inventors: Maeda Toshiyuki; Yasuda Shuji; Onoe Seizo, all of Kanagawa, Japan

[73] Assignee: Nippon Telegraph and Telephone Corporation, Tokyo, Japan

[21] Appl. No.: 585,344

[22] Filed: Sep. 19, 1990

[30] Foreign Application Priority Data

Sep. 19, 1989 [JP] Japan .................................. 1-240824
Nov. 7, 1989 [JP] Japan .................................. 1-287869

[51] Int. Cl.$^5$ ............................................. H04Q 7/00
[52] U.S. Cl. ....................................... 455/33; 455/34; 455/54; 455/62; 455/67
[58] Field of Search ..................... 455/33, 34, 54, 56, 455/62, 63, 67; 379/59, 60, 63

[56] References Cited

U.S. PATENT DOCUMENTS

| | | | |
|---|---|---|---|
| 4,736,453 | 4/1988 | Schloemer | 455/33 |
| 4,771,448 | 9/1988 | Koohgoli | 379/60 |
| 4,783,780 | 11/1988 | Alexis | 370/95 |
| 4,965,850 | 10/1990 | Schloemer | 455/33 |
| 4,977,612 | 12/1990 | Wilson | 455/166 |

FOREIGN PATENT DOCUMENTS 55-50427 12/1980 Japan .

Primary Examiner—Curtis Kuntz
Assistant Examiner—Chi H. Pham
Attorney, Agent, or Firm—Townsend & Townsend

[57] ABSTRACT

According to a channel assigning method for use in a mobile communication system, a base station selects, in response to a communication connection request, a communication radio channel having an interference wave reception level which is obtained by a measuring unit and satisfies a quality conditions of a communication channel from a plurality of communication radio channels, and transmits information of the communication radio channel to a mobile station as an object of the communication connection request. The mobile station selects the communication radio channel transmitted by the base station, measures an interference wave reception level, and transmits the measurement result to the base station. The base station checks whether the measurement result satisfies the quality conditions of a communication path, and assigns the communication radio channel to the requested communication when the measurement result satisfies the quality conditions of a communication path.

4 Claims, 8 Drawing Sheets

FIG.6

| SIGNAL TYPE | MOBILE STATION No. | CHANNEL No. | 1/0 | BASE STATION No. |
|---|---|---|---|---|

0: CHANNEL DESIGNATION
1: INTERFERENCE AMOUNT MEASUREMENT COMMAND

FIG.7

| SIGNAL TYPE | MOBILE STATION No. | CHANNEL No. | INTERFERENCE AMOUNT LEVEL |
|---|---|---|---|

CHANNEL CORRESPONDENCE TABLE

| BASE STATION No. | NUMBER OF CHANNELS | No. | | | | | |
|---|---|---|---|---|---|---|---|
| BASE STATION 1 | 14 | CHANNEL No. 1-1 | CHANNEL No. 1-2 | ...... | CHANNEL No. 1-14 | | |
| BASE STATION 2 | 18 | CHANNEL No. 2-1 | CHANNEL No. 2-2 | ...... | | CHANNEL No. 2-18 | |
| | | | | | | | |
| | | | | | | | |
| | | | | | | | |
| BASE STATION N | M | CHANNEL No. N-1 | CHANNEL No. N-2 | ...... | | | CHANNEL No. N-M |

FIG. 9

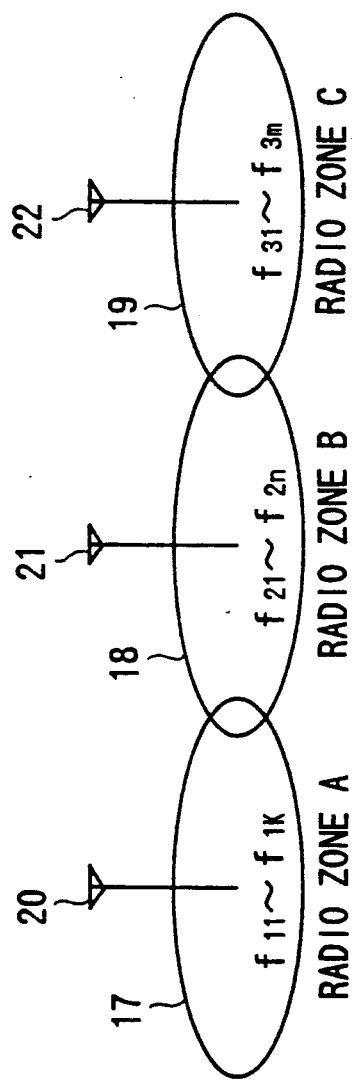

CHANNEL ASSIGNING METHOD IN A MOBILE COMMUNICATION SYSTEM

BACKGROUND OF THE INVENTION

The present invention relates to a communication radio channel assignment control of a mobile communication system which commonly uses a single frequency in a plurality of radio zones and, more particularly, to a method of selecting a communication radio channel having high communication quality when interference is caused from other communication zones.

In a known conventional mobile communication system, a radio zone capable of effectively performing communication with a mobile station is set about a single base station, and the base station and the mobile station in the radio zone perform communication by designating a communication radio channel. When a traffic density is high and a large number of communication channels are present, a control radio channel for selecting a communication radio channel is often provided in addition to the communication radio channels.

In order to effectively use a radio frequency, a mobile communication system for servicing a wide area adopts a small zone system in which a radio zone is divided into small zones and a single radio frequency is locally repeatedly used (a range to which a radio wave from a base station reaches is called a zone, and a base station arranging method and a method of repeatedly using a frequency are called a zone arranging method).

In general, when a radio frequency band (the number of radio channels) given to a system is constant, a subscriber capacity is increased as the area of a repetitive area is decreased. In an urban area having a high traffic density, therefore, a zone must be densely arranged as small as possible in order to effectively use a frequency. As the density of a zone is increased, a repetitive use distance of a single radio frequency is shortened to increase the subscriber capacity. In this case, interference from the same radio frequency in a peripheral region can be theoretically so controlled as not to be increased. Actually, however, interference of the same channel is increased upon repetitive use due to an influence of configuration of the ground or natural feature on the earth, thereby significantly degrading communication quality.

FIG. 1 is a view for explaining interference in a base station and a mobile station. Referring to FIG. 1, reference numeral 51 denotes a radio wave of a communication radio channel; 52 and 53, jamming waves from communication radio channels having the same frequency; 54, a base station; 55, a mobile station; and 56 and 57, radio zones.

The base station 54 receives the jamming wave 52 in addition to the radio wave 51 of the communication radio channel. This jamming wave 52 functions as an interference wave. The mobile station 55 receives the jamming wave 53 in addition to the radio wave 51 of the communication radio channel, and this jamming wave 53 functions as an interference wave. As is apparent from FIG. 1, a propagation path of interference caused by the jamming wave 52 is different from that of interference caused by the jamming wave 53. That is, interference conditions are generally different between a base station and a mobile station.

As described above, interference is easily caused when a single frequency is commonly used in a plurality of radio zones and, especially when repetitive use is densely performed in order to increase a use efficiency of the frequency.

As a prior art, a method of detecting, upon selection of a communication channel, the presence of a radio wave received by a communication channel in a base station and selecting a communication channel free from radio wave interference in the base station is available (Japanese Patent Laid-Open No. 53-28311). In general, however, since interference conditions are different between a base station and a mobile station, interference cannot be prevented from being caused at a mobile station side when a communication channel is selected in a base station.

In addition, a method of measuring a reception level of an interference wave when a communication channel is designated for a mobile station and a base station and performing channel switching in a radio zone when a degree of interference is high has been adopted.

This channel switching method, however, cannot be a suitable method since its control load is comparatively high and radio link hit or noise mixing occurs to degrade communication quality.

In addition, the method has another problem in which when an assigned communication radio channel is interfered immediately after assignment, predetermined quality cannot be obtained until channel switching is performed in a zone.

SUMMARY OF THE INVENTION

It is an object of the present invention to provide a channel assigning method capable of obtaining communication quality higher than that obtained by a conventional method.

In order to achieve the above object, according to the first aspect of the present invention, there is provided a channel assigning method for use in a mobile communication system in which a plurality of base stations constituting small radio zones for performing communication connection with a mobile station are distributed in a service area, a plurality of communication radio channels for use in communication with the mobile station are arranged for each of the base stations, and when a communication connection request is generated, a communication radio channel which satisfies quality conditions of a communication path is selected and assigned, each the base station and the mobile station including means for measuring an interference wave reception level of a communication radio channel, comprising the steps of causing a base station to select, in response to the communication connection request, a communication radio channel having an interference wave reception level which is obtained by the measuring means and satisfies the quality conditions of a communication channel from the plurality of communication radio channels, and transmit information of the communication radio channel to a mobile station as an object of the communication connection request, causing the mobile station to select the communication radio channel transmitted by the base station, measure an interference wave reception level, and transmit the measurement result to the base station, and causing the base station to check whether the measurement result satisfies the quality conditions of a communication path, and assign the communication radio channel to the requested communication when the measurement result satisfies the quality conditions of a communication path.

According to the second aspect of the present invention, there is provided a channel assigning method for use in a mobile communication system in which a plurality of base stations constituting small radio zones for performing communication connection with a mobile station are distributed in a service area, a plurality of communication radio channels for use in communication with the mobile station are arranged in each of the base stations, and when a communication connection request is generated, a communication radio channel which satisfies quality conditions of a communication path is selected and assigned, each the base station and the mobile station including means for measuring an interference wave reception level of a communication radio channel, comprising the steps of causing a mobile station to select, in response to the communication connection request, a communication radio channel having an interference wave reception level which is obtained by the measuring means and satisfies the quality conditions of a communication path from the plurality of communication radio channels, and transmit information of the communication radio channel to a base station, causing the base station to measure an interference wave reception level of the communication radio channel transmitted by the mobile station, and causing the base station to check whether the measurement result satisfies the quality conditions of a communication path, and assign the communication radio channel to the requested communication when the measurement result satisfies the quality conditions of a communication path.

According to the present invention, in each of a base station and a mobile station, the quality of a communication radio channel to be assigned is measured to select a communication radio channel which satisfies predetermined quality, and then assignment of the communication radio channel is performed, thereby preventing an interfered communication radio channel from being selected upon channel assignment.

More specifically, according to the first aspect of the present invention, upon assignment of a communication radio channel to be performed in response to a communication connection request, a base station selects a high-quality communication radio channel having a low interference wave reception level and transmits this information to a corresponding mobile station. The mobile station transmits a measurement result of an interference wave reception level of the radio channel to the base station, and the base station checks whether the measurement value satisfies quality conditions of a communication path.

According to the second aspect of the present invention, upon assignment of a communication radio channel to be performed in response to a communication connection request, a mobile station selects a high-quality communication radio channel having a low interference wave reception level and transmits this information to a base station. The base station measures an interference wave reception level of the communication radio channel and checks whether the measurement value satisfies quality conditions of a communication path.

BRIEF DESCRIPTION OF THE DRAWINGS

FIG. 6 is a view showing a format of a downward control channel;

FIG. 7 is a view showing a format of an upward control channel;

FIG. 9 is a table showing a correspondence between base stations and mobile stations;

FIG. 10 is a view showing a communication radio channel which can be used in each radio zone; and FIG. 11 is a view showing a format of broadcasting information.

DETAILED DESCRIPTION OF THE PREFERRED EMBODIMENTS

Preferred embodiments of the present invention will be described in detail below with reference to the accompanying drawings.

Figure 1:
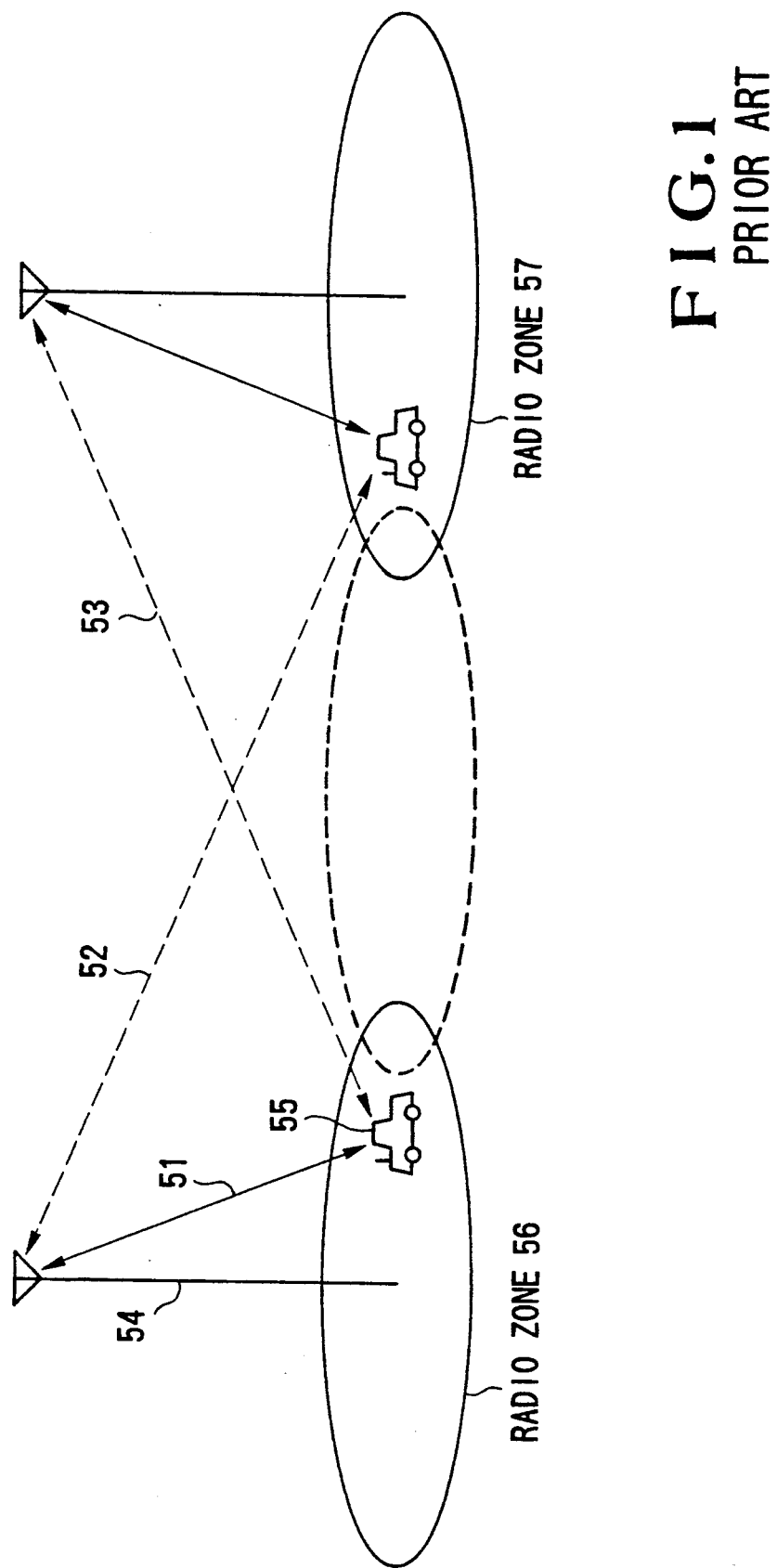
FIG. 1 is a view for explaining interference in a base station and a mobile station.
Figure 2:
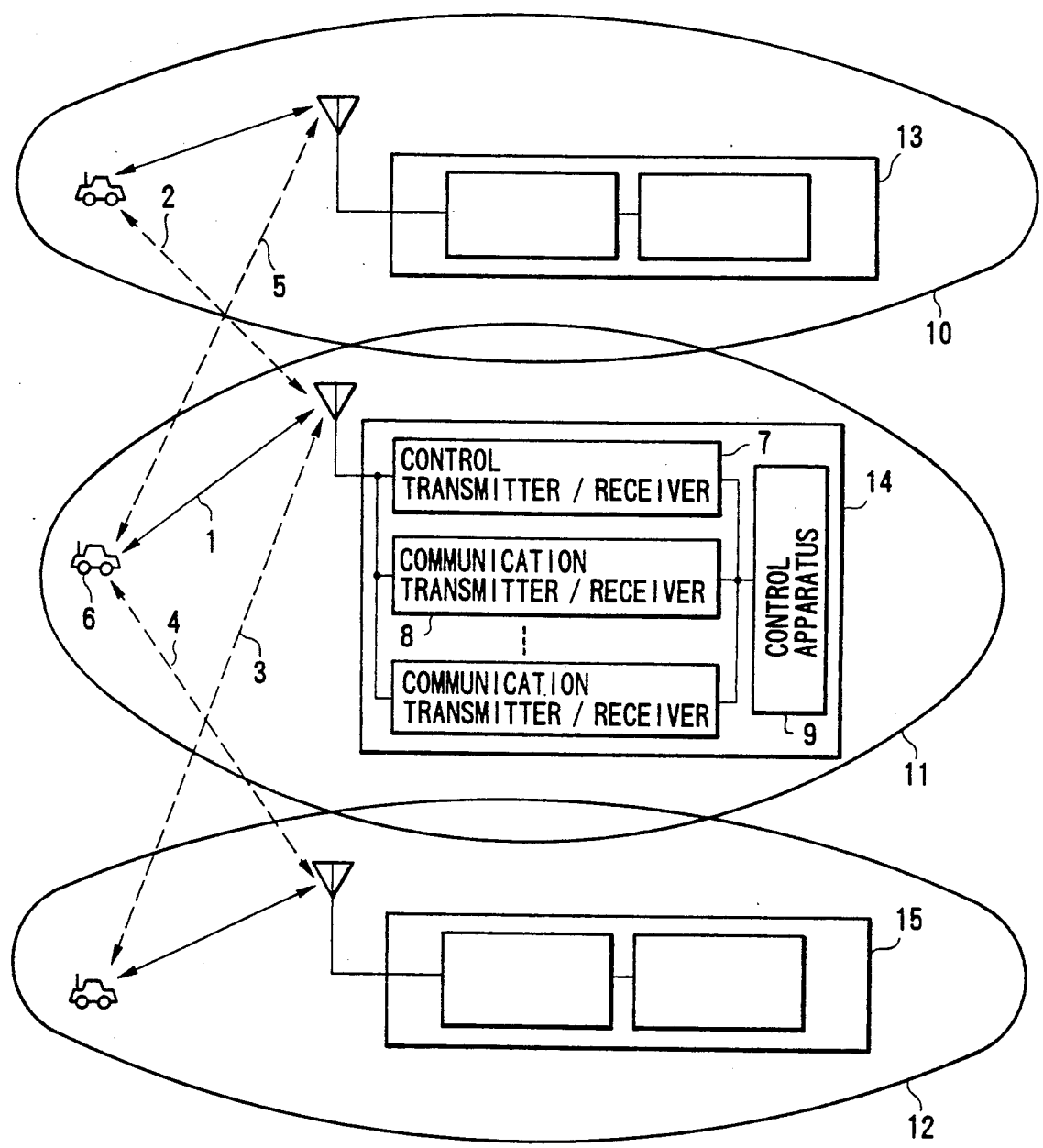
FIG. 2 is a view showing an arrangement of a base station and a relationship between zones.
Figure 3:
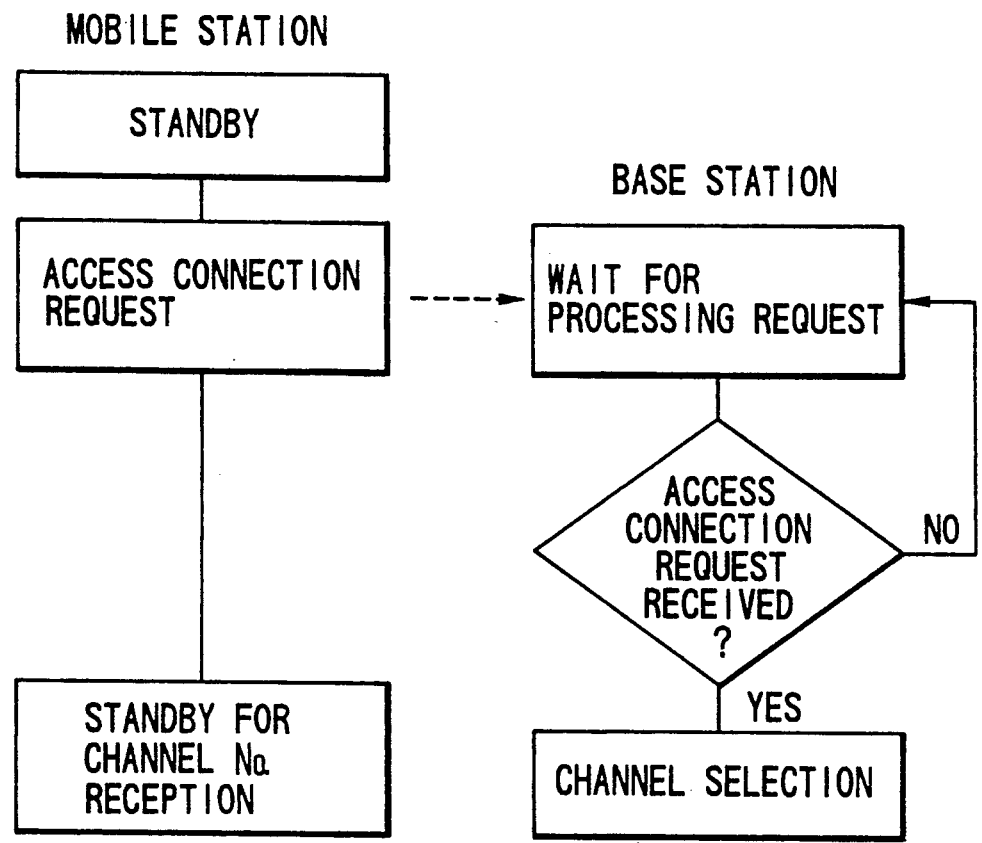
FIG. 3 is a flow chart for explaining an access connection request from a mobile station.
Figure 4:
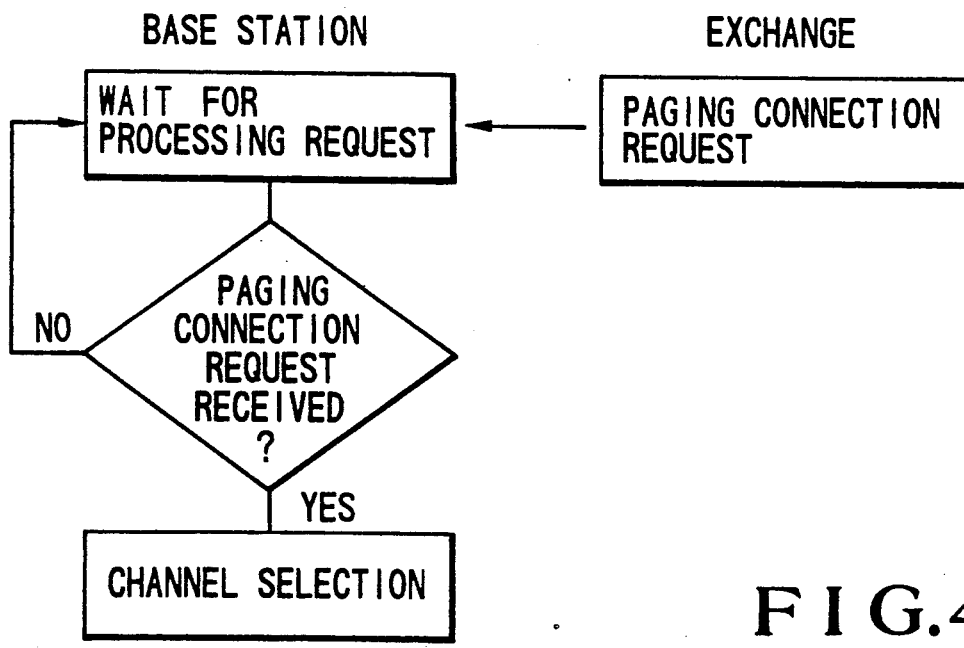
FIG. 4 is a flow chart for explaining a paging request from a fixed network side.
Figure 5:
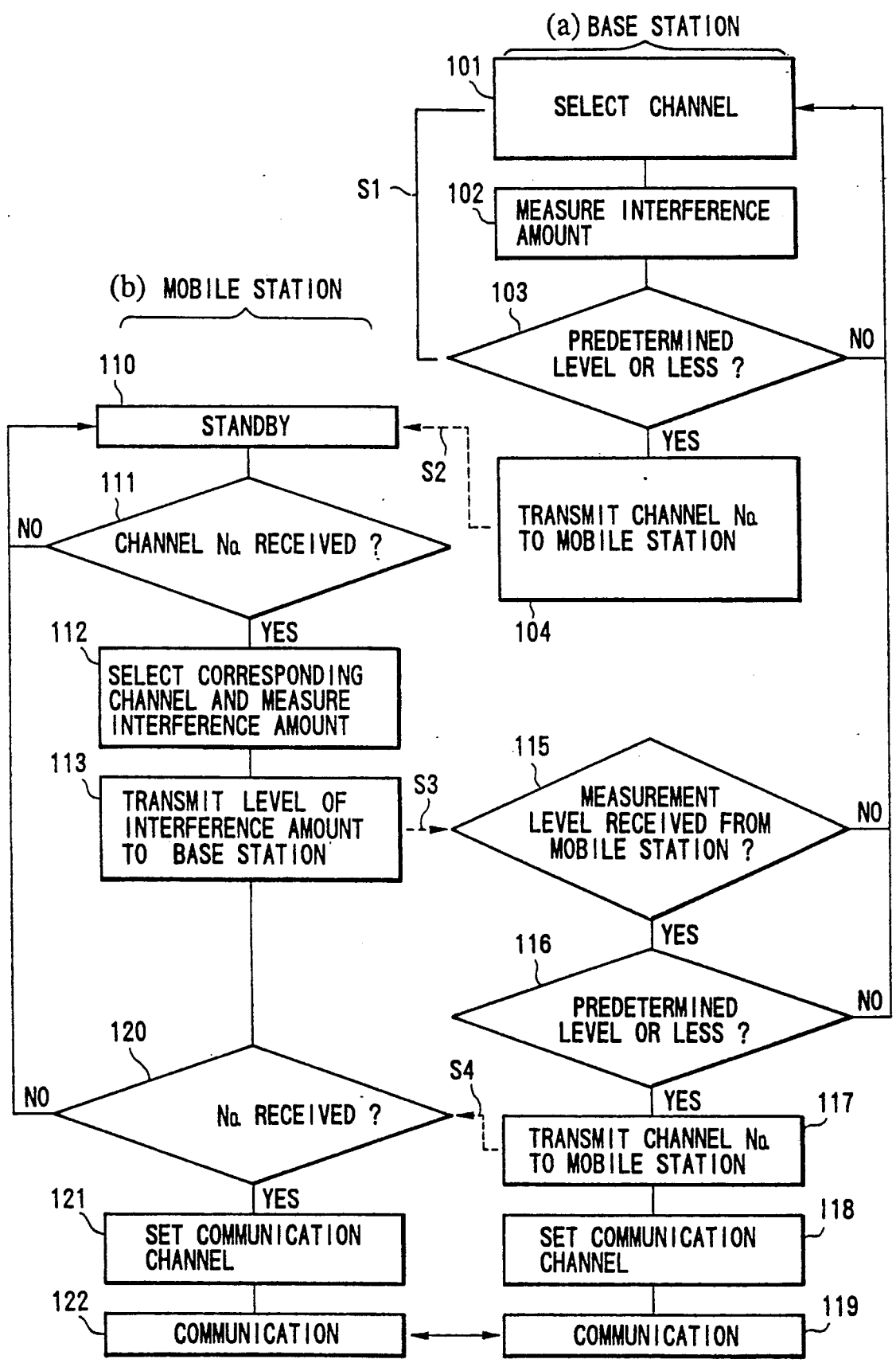
FIG. 5 is a flow chart for explaining control sequences of a base station and a mobile station according to an embodiment of the present invention.

FIG. 2 shows an arrangement of a base station and a relationship between zones according to the present invention, and FIGS. 3 and 4 show an access connection request from a mobile station which causes channel assignment and a paging connection request from a fixed network side according to the present invention. In each of FIGS. 3 and 4, processing from channel selection is the same as that shown in FIG. 5. FIG. 5 shows control sequences of a base station and a mobile station according to an embodiment of the present invention. Reference symbol (a) in FIG. 5 denotes a control sequence in the base station; and (b), a control sequence in the mobile station. FIGS. 6 and 7 show formats of signals transmitted/received between the base station and the mobile station at timings S2 and S3 shown in FIG. 5.

Referring to FIG. 2, reference numerals 1 denote communication radio channels; 2, 3, 4, and 5, interference waves; 6, mobile stations; 7, a control transmitter/receiver; 8, communication transmitter/receivers; 9, a control apparatus; 10, 11, and 12, radio zones; and 13, 14, and 15, base stations of the respective zones. The control apparatus 9 executes channel assignment control to be described below.

An operation of the first embodiment of the present invention will be described below. When access and paging connection requests (to be referred to as communication connection requests hereinafter: see FIGS. 3 and 4) are generated from a mobile station and an exchange, respectively, a base station which receives the communication connection requests, e.g., the base station 14 in the zone 11 shown in FIG. 2 selects one empty channel from communication radio channels prepared as a communication radio channel group. The base station 14 activates the communication transmitter/receiver 8 by the selected channel and measures levels of the interference waves 2 and 3 by a receiving unit. If the interference levels are a predetermined level or less, the base station 14 selects this channel as a communication radio channel. If the interference wave levels are the predetermined level or more, this radio channel is unsuitable for communication. Therefore, the base station 14 selects another communication radio channel from the empty channels. In this manner, the same sequence as a portion S1 (steps 101, 102, and 103) at the base station side (a) shown in FIG. 5 is repeatedly performed until a communication radio channel having an interference wave level of the predetermined level or less is obtained.

If no communication radio channel having an interference wave level of the predetermined level or less can be obtained, a communication radio channel having a minimum interference wave level is selected from the communication radio channels measured by the above sequence.

After the base station 14 selects a communication radio channel by the above sequence, it broadcasts the selected communication radio channel number to the mobile station 6 by the control transmitter/receiver 7. This operation corresponds to step 104 and a portion S2 in FIG. 5, and a downward signal format of the control channel in this case is shown in FIG. 6. In this embodiment, a signal format constituted by a signal type, a mobile station number, a channel number, channel designation/interference amount measurement designation, and a base station number is used.

When the mobile station 6 which constantly measures a reception level of a control communication channel in the stand-by mode receives this communication radio channel number from the base station 14, it selects this communication radio channel and measures levels of the interference waves 4 and 5. Since the base station does not transmit any radio wave by this communication radio channel, a D-wave level cannot be measured.

The mobile station 6, therefore, determines that the control radio channel reception level is a D-wave level, calculates a ratio of a desired signal to an undesired signal (D/U ratio) in accordance with a relative value with respect to the interference wave reception level measured in the communication radio channel, and transmits the calculated value to the base station by the control radio channel (generally in a random-access manner). This operation corresponds to steps 110 to 113 and a portion S3 in FIG. 5. A format of a control channel upward signal in this case is shown in FIG. 7. Referring to FIG. 7, the signal is constituted by a signal type, a mobile station number, a channel number, and an interference amount level. Note that if the mobile station does not receive the channel number, the flow returns to the stand-by mode in step 110.

The base station 14 confirms that the D/U ratio in the mobile station 6 is a predetermined level or more, selects the communication radio channel, and transmits the selected communication channel number to the mobile station. Both the base and mobile stations perform actual communication channel setting and start communication. This operation corresponds to steps 115 to 119, a portion S4, and steps 120, 121, and 122 shown in FIG. 5. When the mobile station does not receive any channel number in step 120, the flow returns to step 110 in which the mobile station is set in the stand-by mode.

If the D/U ratio in the mobile station 6 is the predetermined level or less in step 116, the base station 14 determines that assignment of the communication radio channel is unsuitable, selects another empty channel, and measures the level of an interference wave, thereby repeatedly executing the above sequence. This operation corresponds to processing in a portion S1 and step 104 shown in FIG. 5.

Figure 8:
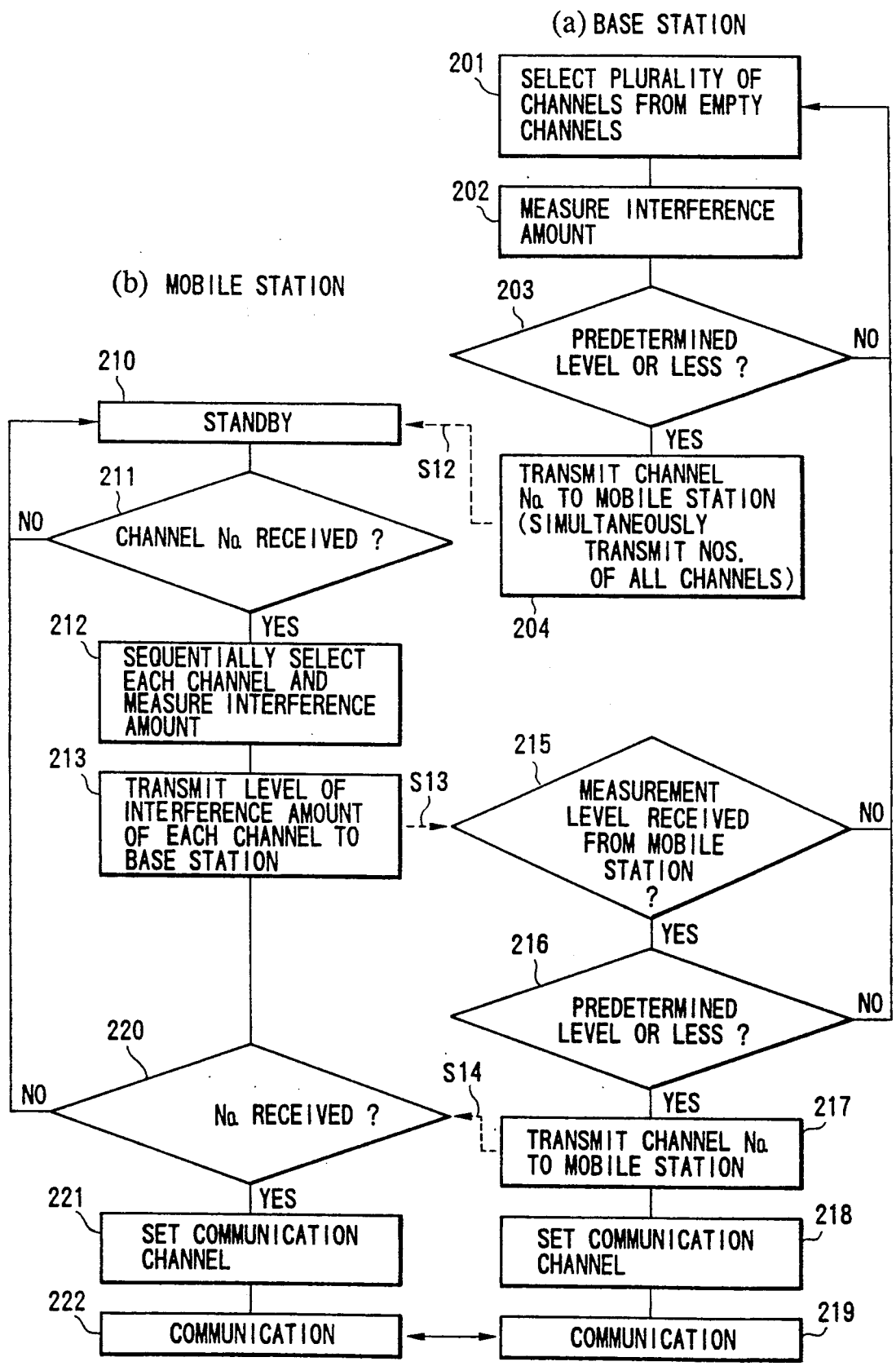
FIG. 8 is a flow chart for explaining control sequences of a base station and a mobile station according to another embodiment of the present invention.

FIG. 8 is a flow chart for explaining control sequences of a base station and a mobile station according to the second embodiment of the present invention.

Referring to FIG. 8, reference symbol (a) denotes a base station side; and (b), a mobile station side.

An operation of the second embodiment will be described below with reference to FIGS. 2 and 8.

When a communication connection request is generated, a base station selects a plurality of empty channels from communication radio channels prepared as a communication radio channel group, and measures an interference wave level of the selected communication radio channel in accordance with the above sequence. This operation corresponds to steps 201 and 202 shown in FIG. 8. For example, the base station measures interference wave levels of all communication radio channels which are empty upon calling.

The base station simultaneously transmits these communication radio channel numbers to a mobile station 6 by a control transmitter/receiver 7. This operation corresponds to step 204 and a portion S12 shown in FIG. 8.

When the mobile station 6 which constantly measures a reception level of a control radio channel in a waiting state receives these communication radio channel numbers from the base station, it sequentially switches the communication radio channels transmitted by the base station and measures their interference wave levels. After the mobile station measures the interference wave level of all of the transmitted communication radio channels, it transmits a relative value between the control radio channel reception level and the interference wave level, i.e., a D/U ratio of each of all the channels to the base station by a control radio channel. This operation corresponds to steps 210 to 213 and a portion S13 shown in FIG. 8.

The base station 14 selects a channel having a maximum D/U ratio in the mobile station 6 and transmits the selected radio channel number to the mobile station. Both the mobile and base stations start communication by the selected communication channel. This operation corresponds to steps 215 to 219 and steps 220 to 222 shown in FIG. 8.

If all the D/U ratios in the mobile station are a predetermined level or less, a communication radio channel having a maximum D/U ratio is used for communication.

Note that if only some communication radio channels of the empty channels are used in the first place, the above sequence may be repeatedly performed such that a plurality of channels are selected from the remaining communication radio channels and an interference wave level of each channel is measured and transmitted to the mobile station.

Still another embodiment of the present invention will be described below. In each of the above embodiments, upon assignment of a communication radio channel to be performed in response to a communication connection request, a base station selects a communication radio channel having a low interference reception level and transmits the selected channel number to a mobile station. In response to this transmitted channel number, the mobile station measures an interference wave reception level of the corresponding communication radio channel and transmits the measurement result to the base station. In the following embodiment, however, upon assignment of a communication radio channel to be performed in response to a communication connection request, a mobile station selects a communication radio channel having a low interference wave reception level and transmits the selected channel number to a base station.

An operation of the mobile station will be described below. That is, the mobile station has two states, i.e., the stand-by mode and the communication mode, and mode transition from the stand-by mode to communication mode is performed via a control process of either access or paging. While the former control is of a random-access type which is started from a mobile station side, the latter control is of a paging type which is started from a base station.

A plurality of channels are set as broadcast control channels for use in paging in a mobile station. The mobile station switches the broadcast control channels in a predetermined set order and selects a channel having a reception level higher than a predetermined level. The mobile station constantly maintains stand-by mode by this broadcast control channel in a non-communication mode.

Several embodiments of the present invention will be described below on the basis of the operation of a mobile station as described above.

The third embodiment will be described below with reference to FIG. 2 by taking a case in which the above broadcasting information is not used (a case in which the broadcasting information is used will be described later) as an example.

Since a mobile station measures a reception level of a control radio channel in the stand-by mode described above, the reception level of the control radio channel can be handled equivalently to the level of a communication radio channel to be originally used, and it can be determined that communication quality is improved as a relative value with respect to an interference wave level is increased.

A mobile station scans control radio channels to select a base station. The mobile station has a table representing a correspondence between each base station and codes of communication channels provided at the base station as shown in FIG. 9. The mobile station measures reception levels of interference waves 4 and 5 of each communication channel listed in the correspondence table prior to other channels and records a relative value with respect to the reception level of the control radio channel.

When a communication connection request is generated, the mobile station selects a communication radio channel having a maximum relative value of the recorded values and measures an interference wave level of the channel. The mobile station confirms that the relative value with respect to the reception level of the control radio channel is a predetermined level or more and satisfies predetermined quality. In this case, if the measurement value is the predetermined value or less, the mobile station determines that the value does not satisfy the predetermined quality and sequentially selects higher values from the recorded relative values, thereby repeatedly performing the above sequence until a communication channel which satisfies the predetermined quality is obtained. The mobile station transmits the selected communication radio channel number to the base station by the control radio channel.

The control apparatus 9 of the base station shown in FIG. 2 activates the communication transmitter/receiver 8 by the communication radio channel transmitted by the mobile station and measures reception levels of the interference waves 2 and 3. The communication transmitter/receiver 8 transfers the measurement values to the control apparatus 9. If the measurement values are a predetermined value or less, the control apparatus 9 determines that the corresponding radio channel satisfies predetermined quality, performs actual assignment of the communication radio channel, and transmit the selected channel number to the mobile station, thereby starting actual communication. If the measurement values are the predetermined level or more, the control apparatus 9 determines that the selected channel is unsuitable as a communication radio channel and sends a channel selection request to the mobile station by the control radio channel.

The mobile station selects a communication radio channel having a high relative value from the recorded channels except for the already selected communication radio channel and measures an interference wave reception level, thereby repeatedly performing the above sequence. Embodiments using broadcasting information will be described below.

In the fourth and fifth embodiments to be described below, a base station broadcasts a frequency code of a communication radio channel to be measured to a mobile station by using broadcasting information of a control radio channel.

In general, several hundreds of channels are used as communication radio channels, and a relatively long processing time is required to measure interference wave levels by switching all the channels. If, however, communication radio channels to be measured by a mobile station can be limited by some means, the processing time can be shortened.

For this purpose, the fourth embodiment of the present invention adopts a method of performing measurement after a communication connection request is generated.

FIG. 10 shows a relationship between communication channels and zones, in which reference numerals 17 to 19 denote radio zones; and 20 to 22, base stations.

Referring to FIG. 10, communication radio channels to be used prior to other channels are set in each of the radio zones 17 to 19. For example, communication radio channels $f_{11}$ to $f_{1k}$ (the number of channels is k) are set in a radio zone A denoted by 17, communication radio channels $f_{21}$ to $f_{2n}$ (the number of channels is n) are set in a radio zone B denoted by 18, and communication radio channels $f_{31}$ to $f_{3m}$ (the number of channels is m) are set in a radio zone C denoted by 19.

In order to limit communication radio channels to be measured by a mobile station, a base station broadcasts communication radio channels to be measured to a mobile station by broadcasting information. The base station has information of communication radio channels which can be used prior to other channels in each zone as shown in FIG. 10 and broadcasts communication radio channel numbers to a mobile station in each zone by a control radio channel before a communication connection request is generated.

A subsequent operation will be described below with reference to FIG. 2.

When a communication connection request is generated, the mobile station 6 sequentially switches communication radio channels on the basis of the communication radio channel numbers broadcast from the base station and measures reception levels of the interference waves 4 and 5. The mobile station 6 transmits a relative value between the control radio channel reception level and the interference wave reception level to the base station 14 by the control radio channel.

The base station 14 selects a communication channel having a high relative value (high quality) of the relative values of the channels transmitted by the mobile station 6 prior to other channels, activates the communication transmitter/receiver 8 by the selected communication radio channel, and measures reception levels of the interference waves 2 and 3.

If the measurement levels are a predetermined level or less, the control apparatus 9 assigns the selected channel as a communication radio channel. If the levels are the predetermined level or more, the control apparatus 9 determines that the selected channel is unsuitable. The control apparatus 9, therefore, selects another communication channel having a high relative value from the remaining communication radio channels and measures interference wave levels, thereby repeatedly performing the above sequence until a communication radio channel which satisfies predetermined quality. If no communication radio channel which satisfies the predetermined quality can be obtained, the control apparatus 9 selects a communication radio channel having a lowest interference wave reception level of the levels measured by the base station to perform channel assignment.

An embodiment shown in FIG. 10 adopts a method of measuring an interference wave level in the stand-by mode.

This embodiment will be described below.

A base station has information of communication radio channels which can be used in each zone as shown in FIG. 10 and broadcasts the communication radio channel numbers to a mobile station in each zone by a control radio channel.

In the stand-by mode, the mobile station sequentially switches communication radio channels assigned for communication to measure reception levels of the interference waves 4 and 5 shown in FIG. 2 and records a relative value with respect to a reception level of the control radio channel.

When a communication connection request is generated, the mobile station selects a communication radio channel having a large relative value of the recorded relative values prior to other channels and measures an interference wave reception level. The mobile station confirms that the reception level of the control radio channel is a predetermined level or more and satisfies predetermined quality.

If the relative value is the predetermined value or less, the mobile station determines that the selected channel does not satisfy the predetermined quality. The mobile station, therefore, sequentially selects channels having higher relative values of the recorded relative values and repeatedly performs the above sequence until a communication radio channel which satisfies the predetermined quality is obtained. The mobile station transmits the selected communication radio channel number to the base station by the control radio channel.

The control apparatus 9 of the base station shown in FIG. 2 activates the communication transmitter/receiver 8 by the communication radio channel transmitted from the mobile station and measures reception levels of the interference waves 2 and 3.

The communication transmitter/receiver 8 transfers the measurement values to the control apparatus 9. If the measurement values are a predetermined value or less, the control apparatus 9 determines that the selected channel satisfies predetermined quality. The control apparatus 9, therefore, assigns the channel as an actual communication radio channel and transmits the selected channel number to the mobile station, thereby performing actual communication. If the measurement values are the predetermined value or more, the control apparatus 9 determines that the selected channel is unsuitable and sends a channel selection request to the mobile station by the control radio channel. A broadcast signal format in this case is shown in FIG. 11. In this embodiment, the signal is constituted by a message type, area information (call area identification number), a base station number (1), communication channel code group, . . . , a base station number (N), and a communication channel code group.

The mobile station selects a communication radio channel having a high relative value from the recorded channels except for the already selected communication radio channel and measures an interference wave reception level, thereby repeatedly performing the above sequence.

As the sixth embodiment of the present invention, a method of performing broadcasting of a communication radio channel selection method will be described below.

When a communication radio channel is to be selected in accordance with recorded relative values as described above, a use efficiency of communication radio channels can be further increased by using the following method as a selection method.

For example, a method of selecting a communication radio channel from relative values of measurement results in accordance with a margin of a difference between a relative value of a measurement result and a predetermined value for satisfying predetermined quality is broadcast.

For example, if communication radio channels are insufficient in a most frequent state, a mobile station is designated to select a communication radio channel having a minimum margin. In this manner, communication can be provided to a large number of users with high quality.

In addition, by selecting a communication radio channel having a largest margin in a non-busy state, communication radio channels can be effectively used in accordance with a traffic variation.

As has been described above, according to the present invention, even if an interfered communication radio channel is present, assignment of a communication radio channel which satisfies predetermined quality can be rapidly performed.

That is, in the present invention, on the basis of the fact that a downward interference wave level is different from an upward interference wave level in one communication radio channel, an interference wave level is measured in each of a base station and a mobile station to check whether a communication radio channel can be assigned. Therefore, since the assigned communication channel is not interfered by a destination station and therefore need not be switched again, a high-quality communication radio channel can be rapidly assigned, and a control load can be reduced.

What is claimed is:

1. A channel assigning method for use in a mobile communication system in which a plurality of base stations constituting small radio zones for performing communication connection with a mobile station are distributed in a service area, a plurality of communication radio channels for use in communication with said mobile station are arranged for each of said base stations, and when a communication connection request is generated, a communication radio channel which satisfies quality conditions of a communication path is selected and assigned, each said base station and said mobile station including means for measuring an interference wave reception level of a communication radio channel, comprising the steps of:

causing a base station to select, in response to the communication connection request, a communication radio channel having an interference wave reception level which is obtained by said measuring means and satisfies the quality conditions of a communication channel from said plurality of communication radio channels, and transmit information of said communication radio channel to a mobile station as an object of the communication connection request;

causing said mobile station to select said communication radio channel transmitted by said base station, measure an interference wave reception level, and transmit the measurement result to said base station; and causing said base station to check whether the measurement result satisfies the quality conditions of a communication path, and assign said communication radio channel to the requested communication when the measurement result satisfies the quality conditions of a communication path.

2. A method according to claim 1, wherein said base station selects a plurality of communication radio channels in response to the communication connection request, said mobile station measures an interference wave reception level of each of said plurality of communication radio channels, and said base station selects, in accordance with the measurement results of said plurality of communication radio channels transmitted from said mobile station, one of said communication radio channels which satisfies predetermined quality conditions.

3. A method according to claim 1, wherein if said base station determines that the measurement result transmitted from said mobile station and indicating an interference wave reception level of said communication radio channel designated by said base station does not satisfy the quality conditions of a communication level, said base station assigns another communication radio channel to check the quality of a measurement result of an interference wave reception level obtained by said mobile station.

4. A channel assigning method for use in a mobile communication system in which a plurality of base stations constituting small radio zones for performing communication connection with a mobile station are distributed in a service area, a plurality of communication radio channels for use in communication with said mobile station are arranged in each of said base stations, and when a communication connection request is generated, a communication radio channel which satisfies quality conditions of a communication path is selected and assigned, each said base station and said mobile station including means for measuring an interference wave reception level of a communication radio channel, comprising the steps of:

causing a mobile station to select, in response to the communication connection request, a communication radio channel having an interference wave reception level which is obtained by said measuring means and satisfies the quality conditions of a communication path from said plurality of communication radio channels, and transmit information of said communication radio channel to a base station;

causing said base station to measure an interference wave reception level of said communication radio channel transmitted by said mobile station; and causing said base station to check whether the measurement result satisfies the quality conditions of a communication path, and assign said communication radio channel to the requested communication when the measurement result satisfies the quality conditions of a communication path.

* * * * *